US010190587B2

(12) United States Patent
Kawamura et al.

(10) Patent No.: US 10,190,587 B2
(45) Date of Patent: Jan. 29, 2019

(54) MOTOR-DRIVEN COMPRESSOR

(71) Applicant: KABUSHIKI KAISHA TOYOTA JIDOSHOKKI, Kariya-shi, Aichi-ken (JP)

(72) Inventors: Shinichi Kawamura, Kariya (JP); Takashi Kawashima, Kariya (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 363 days.

(21) Appl. No.: 15/247,074

(22) Filed: Aug. 25, 2016

(65) Prior Publication Data

US 2017/0058898 A1    Mar. 2, 2017

(30) Foreign Application Priority Data

Aug. 28, 2015 (JP) .................................. 2015-168988
Jul. 1, 2016 (JP) .................................. 2016-131959

(51) Int. Cl.
*F04C 18/02* (2006.01)
*F04C 28/06* (2006.01)
(Continued)

(52) U.S. Cl.
CPC ......... *F04C 28/06* (2013.01); *B60H 1/00428* (2013.01); *B60H 1/00735* (2013.01);
(Continued)

(58) Field of Classification Search
CPC .......... F04C 28/06; F04C 28/08; F04C 28/28; F04C 28/0215; F04C 18/0215;
(Continued)

(56) References Cited

U.S. PATENT DOCUMENTS 5,006,045 A    4/1991   Shimoda et al.
5,518,373 A *  5/1996   Takagi .................... F04B 49/06
                                                              417/12
(Continued)

FOREIGN PATENT DOCUMENTS

JP    2003-120555 A    4/2003
JP    2015-126592 A    7/2015
JP       5768863 B2    8/2015

OTHER PUBLICATIONS

Communication dated Jan. 16, 2018 from the Korean Intellectual Property Office in counterpart application No. 10-2016-0107588.

*Primary Examiner* — Nathan C Zollinger
(74) *Attorney, Agent, or Firm* — Sughrue Mion, PLLC

(57) ABSTRACT

A motor-driven compressor includes an electric motor including a rotor, a housing, a compression unit, a drive circuit, and a controller. The controller includes a deceleration controller that performs a deceleration control, which decelerates the rotor, during a first period in response to the rotor being rotating in a direction opposite to the forward direction, and a continuation controller that performs a continuation control, which continues the rotation of the rotor, during a second period that is longer than the first period after the deceleration control is performed. A fluctuation difference of a rotational frequency of the rotor during the continuation control is less than a deceleration rotational frequency difference.

9 Claims, 6 Drawing Sheets

(51) Int. Cl.
*F04C 28/08* (2006.01)
*F04C 28/28* (2006.01)
B60H 1/00 (2006.01)
*F04C 29/00* (2006.01)
*B60H 1/32* (2006.01)

(52) U.S. Cl.
CPC ..... *B60H 1/00907* (2013.01); *F04C 18/0215* (2013.01); *F04C 28/08* (2013.01); *F04C 28/28* (2013.01); *F04C 29/0085* (2013.01); *F04C 29/0092* (2013.01); *B60H 2001/00935* (2013.01); *B60H 2001/3292* (2013.01); *F04C 2210/26* (2013.01); *F04C 2240/40* (2013.01); *F04C 2240/403* (2013.01); *F04C 2270/72* (2013.01)

(58) Field of Classification Search
CPC .............. F04C 29/0092; F04C 29/0085; F04C 2270/72; F04C 2240/403; F04C 2240/40; F04C 2210/26; F04C 2270/13; F04C 2270/135; F04C 28/04; B60H 1/00907; B60H 1/00428; B60H 1/00735; B60H 2001/00935; B60H 2001/3292
See application file for complete search history.

(56) References Cited

U.S. PATENT DOCUMENTS

| | | | | |
|---|---|---|---|---|
| 5,782,610 | A * | 7/1998 | Ikeda | F04C 18/0215 318/379 |
| 5,820,349 | A * | 10/1998 | Caillat | F04C 28/28 417/44.11 |
| 6,210,119 | B1 * | 4/2001 | Lifson | F04C 28/28 417/18 |
| 2014/0260343 | A1 * | 9/2014 | Rite | F25B 49/022 62/56 |
| 2015/0139818 | A1 * | 5/2015 | Nagata | F04C 28/06 417/45 |

\* cited by examiner

MOTOR-DRIVEN COMPRESSOR

BACKGROUND OF THE INVENTION

The present invention relates to a motor-driven compressor.

Japanese Laid-Open Patent Publication No. 2003-120555 discloses an example of a motor-driven compressor that includes a compression unit, which includes a fixed scroll and a movable scroll capable of orbiting the fixed scroll, and an electric motor, which includes a rotor and causes the movable scroll to orbit. The motor-driven compressor includes a compression chamber that is defined by the fixed scroll and the movable scroll and draws in an intake fluid. The orbiting of the movable scroll compresses the intake fluid in the compression chamber and discharges the compressed fluid.

Japanese Laid-Open Patent Publication No. 2003-120555 also describes a motor-driven compressor that includes an injection port, which draws an intermediate pressure fluid having higher pressure than the intake fluid into the compression chamber, and an air conditioner including the motor-driven compressor. The air conditioner includes, for example, an injection pipe connected to the injection port and a gas-liquid separator connected to the injection pipe. The intermediate pressure fluid flows out of the gas-liquid separator and into the compression chamber through the injection pipe and the injection port. This increases the flow rate of the fluid flowing into the compression chamber.

When the motor-driven compressor, which is configured to draw the intermediate pressure fluid into the compression chamber as described above, is deactivated, the residual intermediate pressure liquid in the injection pipe may flow into the compression chamber through the injection port. This may result in a reverse rotation action in which the movable scroll orbits in a direction opposite to the forward direction and reverses the rotation of the rotor. In this situation, noise and vibration tend to increase when the rotational frequency (rotation speed) of the rotor is high.

To promptly stop the rotor, the electric motor may undergo, for example, a forcible deactivation control that forcibly stops the reverse rotation of the rotor. In this case, the intermediate pressure fluid may continue to remain in the injection pipe. The intermediate pressure fluid may cause a reverse rotation recurrence action in which after the rotation of the rotor is stopped, the rotor reversely rotates again. The reverse rotation recurrence action may interfere with, for example, the activation of the motor-driven compressor.

SUMMARY OF THE INVENTION

It is an object of the present invention to provide a motor-driven compressor that limits the occurrence of reverse rotation recurrence actions while limiting noise and vibration.

To achieve the above object, a motor-driven compressor includes an electric motor including a rotor, a housing including a suction port that draws in a fluid, a compression unit driven by the electric motor, a drive circuit that drives the electric motor, and a controller that controls the drive circuit to control rotation of the rotor. The compression unit compresses an intake fluid, which is the fluid drawn in from the suction port, and discharges a compressed fluid, which is the compressed intake fluid. The compression unit includes a fixed scroll fixed to the housing, a movable scroll engaged with the fixed scroll and configured to orbit the fixed scroll, and a compression chamber defined by the fixed scroll and the movable scroll. When the rotor rotates in a predetermined forward direction, the movable scroll orbits in the forward direction, and the compression unit thereby compresses the intake fluid drawn into the compression chamber. The motor-driven compressor further includes an injection port that draws an intermediate pressure fluid into the compression chamber. The intermediate pressure fluid has a pressure that is higher than the intake fluid and lower than the compressed fluid. The controller includes a deceleration controller that performs a deceleration control, which decelerates the rotor, during a first period in response to the rotor being rotating in a direction opposite to the forward direction, and a continuation controller that performs a continuation control, which continues the rotation of the rotor, during a second period that is longer than the first period after the deceleration control is performed. A fluctuation difference of a rotational frequency of the rotor during the continuation control is less than a deceleration rotational frequency difference, which is a difference between a rotational frequency of the rotor when the deceleration control is started and a rotational frequency of the rotor when the deceleration control is terminated.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of a motor-driven compressor will now be described.

Figure 1:
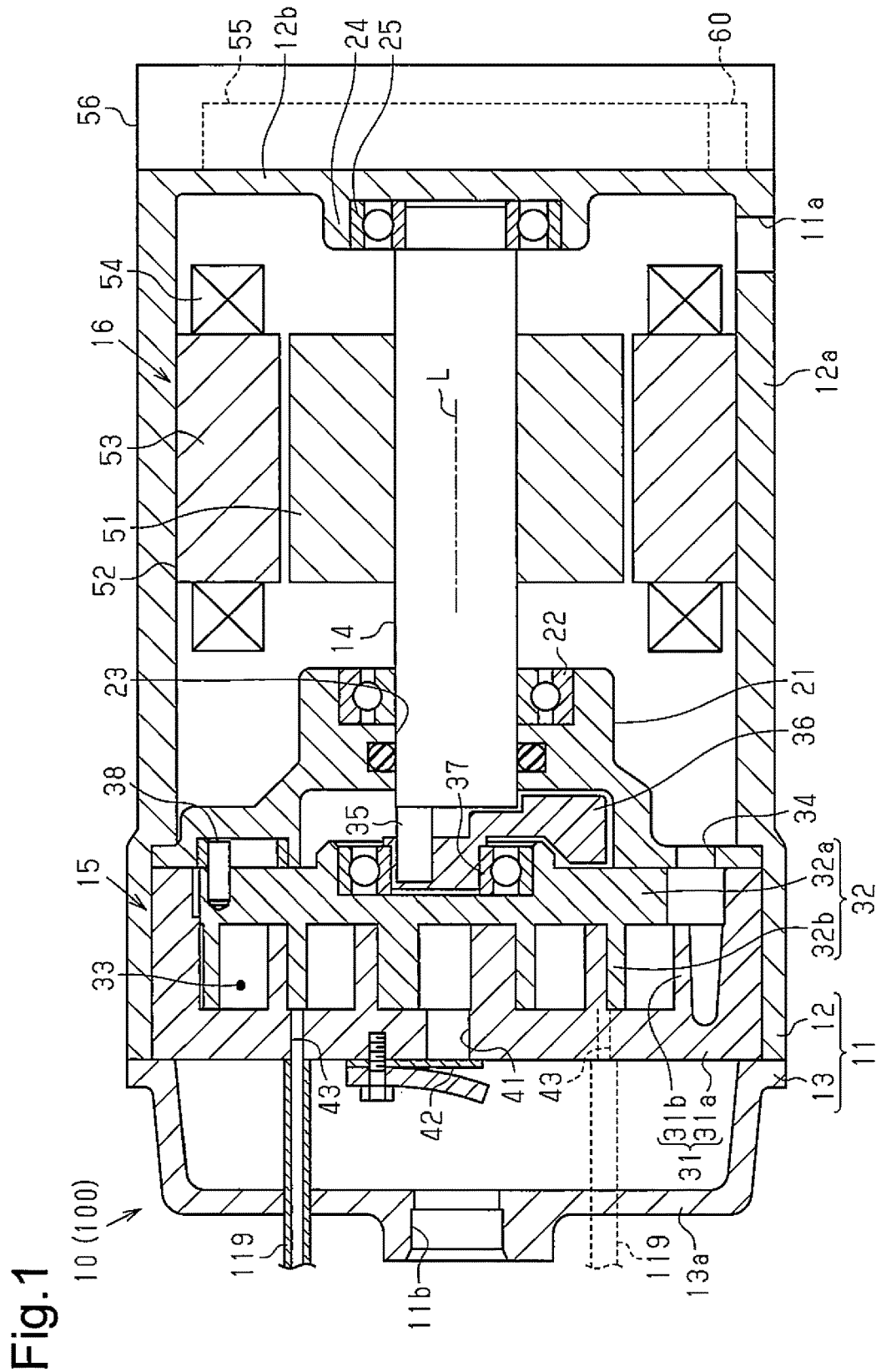
FIG. 1 is a schematic cross-sectional view of a motor-driven compressor.

As shown in FIG. 1, a motor-driven compressor 10 includes a housing 11 provided with a suction port 11a, which draws in a fluid, and an outlet 11b, which discharges the fluid. The housing 11 is tubular as a whole. More specifically, the housing 11 includes a first part 12 and a second part 13, each of which is tubular and has a closed end and an open end. The first part 12 and the second part 13 are coupled to each other with the open ends opposed to each other. The suction port 11a is located in a side wall 12a of the first part 12, more specifically, a portion of the side wall 12a of the first part 12 located proximate to a closed end 12b of the first part 12. The outlet 11b is located in a closed end 13a of the second part 13.

The motor-driven compressor 10 includes a rotation shaft 14, a compression unit 15, which compresses the fluid drawn from the suction port 11a, namely, the intake fluid, and discharges the fluid out of the outlet 11b, and an electric motor 16, which drives the compression unit 15. The rotation shaft 14, the compression unit 15, and the electric motor 16 are accommodated in the housing 11. The electric motor 16 is located in the housing 11 at a side corresponding to the suction port 11a. The compression unit 15 is located in the housing 11 at a side corresponding to the outlet 11b.

The rotation shaft 14 is rotationally accommodated in the housing 11. More specifically, the housing 11 accommodates a shaft support member 21, which rotationally supports the rotation shaft 14. The shaft support member 21 is fixed to the housing 11, for example, at a position between the compression unit 15 and the electric motor 16. The shaft support member 21 is provided with an insertion hole 23 around which a first bearing 22 is arranged. The rotation shaft 14 may be inserted through the insertion hole 23. The shaft support member 21 is opposed to the closed end 12b of the first part 12. A tubular boss 24 projects from the closed end 12b. A second bearing 25 is located at an inner side of the boss 24. The rotation shaft 14 is rotationally supported by the first bearing 22 and the second bearing 25.

The compression unit 15 includes a fixed scroll 31, which is fixed to the housing 11, and a movable scroll 32, which is capable of orbiting the fixed scroll 31.

The fixed scroll 31 includes a disk-shaped fixed base plate 31a, which is coaxial with the rotation shaft 14, and a fixed spiral wall 31b, which projects from the fixed base plate 31a. In the same manner, the movable scroll 32 includes a disk-shaped movable base plate 32a, which is opposed to the fixed base plate 31a, and a movable spiral wall 32b, which projects from the movable base plate 32a toward the fixed base plate 31a.

Figure 2:
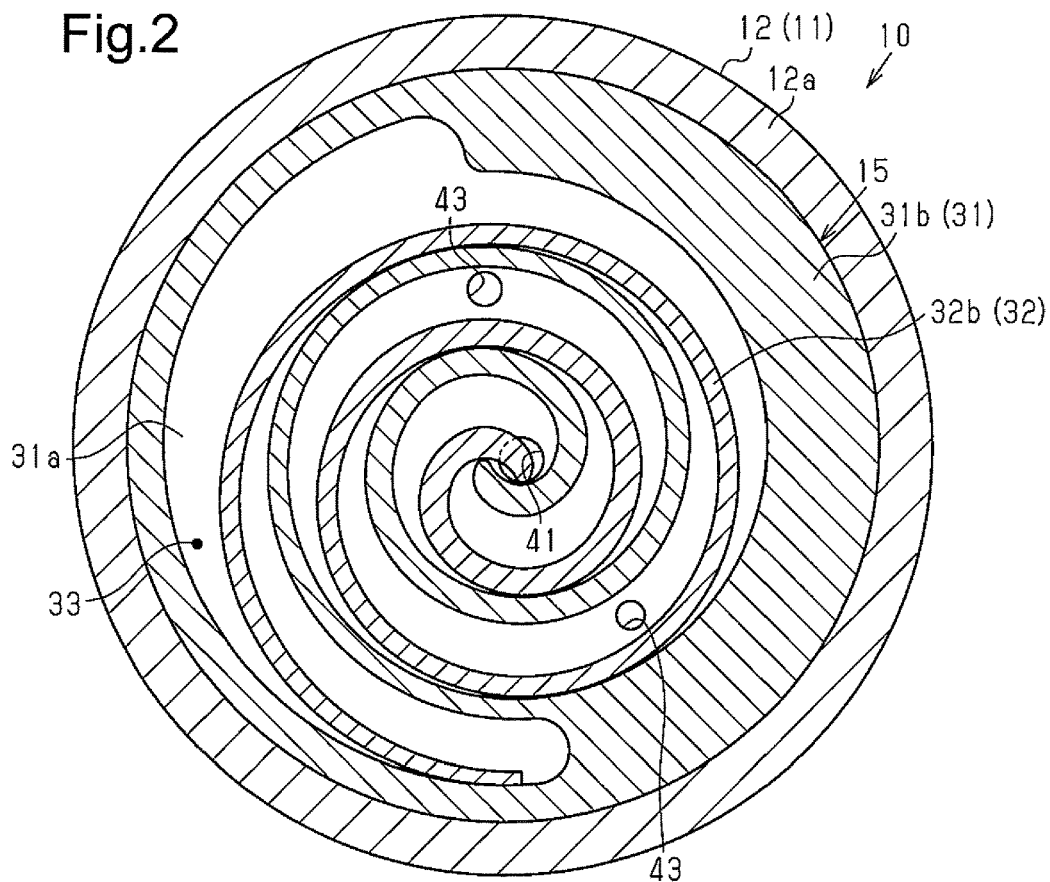
FIG. 2 is a cross-sectional view of a compression unit of the motor-driven compressor shown in FIG. 1.

As shown in FIGS. 1 and 2, the fixed scroll 31 and the movable scroll 32 are engaged with each other. More specifically, the fixed spiral wall 31b and the movable spiral wall 32b are engaged with each other, the fixed spiral wall 31b includes a distal surface that is in contact with the movable base plate 32a, and the movable spiral wall 32b includes a distal surface that is in contact with the fixed base plate 31a. The fixed scroll 31 and the movable scroll 32 define a compression chamber 33. As shown in FIG. 1, the shaft support member 21 includes an intake passage 34 that draws the intake fluid into the compression chamber 33.

The movable scroll 32 is configured to orbit in accordance with the rotation of the rotation shaft 14. More specifically, the rotation shaft 14 partially projects through the insertion hole 23 of the shaft support member 21 toward the compression unit 15. The rotation shaft 14 includes an end surface that is opposed to the compression unit 15. An eccentric shaft 35 is located on a portion of the end surface that is eccentric to an axis L of the rotation shaft 14. A bushing 36 is located on the eccentric shaft 35. The bushing 36 is coupled to the movable scroll 32 (more specifically, movable base plate 32a) by the bearing 37.

The motor-driven compressor 10 includes a rotation restriction portion 38 that restricts rotation of the movable scroll 32 while allowing for the orbiting of the movable scroll 32. The motor-driven compressor 10 includes a plurality of rotation restriction portions 38.

In this structure, when the rotation shaft 14 rotates in a predetermined forward direction, the movable scroll 32 orbits in the forward direction. More specifically, the movable scroll 32 orbits in the forward direction about the axis of the fixed scroll 31 (i.e., axis L of rotation shaft 14). This reduces the volume of the compression chamber 33 and compresses the intake fluid, which has been drawn into the compression chamber 33 through the intake passage 34. The compressed intake fluid, namely, the compressed fluid, is discharged from a discharge port 41 of the fixed base plate 31a and then the outlet 11b. The forward direction may be also referred to as the direction in which the fluid is compressed in a normal manner.

As shown in FIG. 1, a discharge valve 42 is located on the fixed base plate 31a to cover the discharge port 41. The compressed fluid, which has been compressed in the compression chamber 33, pushes the discharge valve 42 aside and is discharged from the discharge port 41.

As shown in FIGS. 1 and 2, the fixed base plate 31a includes injection ports 43 in addition to the discharge port 41. The fixed base plate 31a includes, for example, a plurality of injection ports 43, more specifically, two injection ports 43. The injection ports 43 are arranged in the fixed base plate 31a at a radially outer side of the discharge port 41. The injection ports 43 are connected to an injection pipe 119. The connected subject of the injection pipe 119 will be described later.

The electric motor 16 rotates the rotation shaft 14 to drive the orbiting of the movable scroll 32. As shown in FIG. 1, the electric motor 16 includes a rotor 51, which rotates integrally with the rotation shaft 14, and a stator 52, which surrounds the rotor 51. The rotor 51 is coupled to the rotation shaft 14. The rotor 51 includes a permanent magnet (not shown). The stator 52 is fixed to an inner surface of the housing 11 (more specifically, first part 12). The stator 52 includes a stator core 53, which is radially opposed to the tubular rotor 51, and a coil 54, which is wound around the stator core 53.

The motor-driven compressor 10 includes an inverter 55, which functions as a drive circuit that drives the electric motor 16. The inverter 55 is accommodated in the housing 11, more specifically, a tubular cover member 56 coupled to the closed end 12b of the first part 12. The inverter 55 is electrically connected to the coil 54.

In the present embodiment, the motor-driven compressor 10 is installed in a vehicle and used with a vehicle air conditioner 100. Thus, in the present embodiment, the fluid compressed by the motor-driven compressor 10 is a refrigerant. The vehicle air conditioner 100 will now be described in detail.

Figure 3:
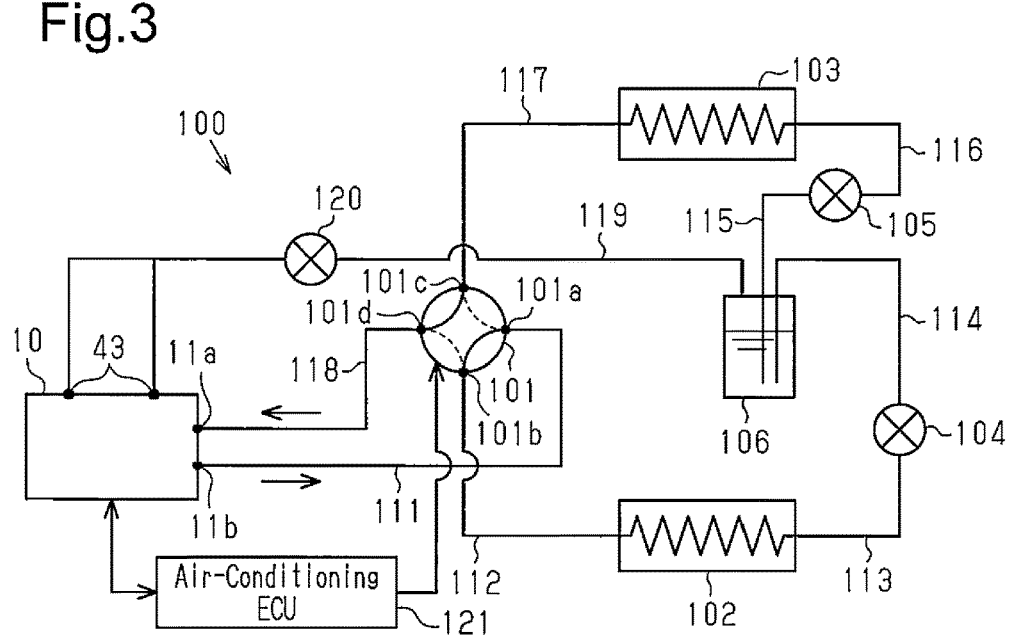
FIG. 3 is a schematic diagram of a vehicle air conditioner.

As shown in FIG. 3, the vehicle air conditioner 100 includes a pipe switch valve 101, a first heat exchanger 102, a second heat exchanger 103, a first expansion valve 104, a second expansion valve 105, and a gas-liquid separator 106.

The pipe switch valve 101 includes ports 101a to 101d. The pipe switch valve 101 switches to a first state or a second state. In the first state, the first port 101a is in communication with the second port 101b, and the third port 101c is in communication with the fourth port 101d. In the second state, the first port 101a is in communication with the third port 101c, and the second port 101b is in communication with the fourth port 101d.

The vehicle air conditioner 100 includes a first pipe 111, which connects the first port 101a and the outlet 11b of the motor-driven compressor 10, a second pipe 112, which connects the second port 101b and the first heat exchanger 102, and a third pipe 113, which connects the first heat exchanger 102 and the first expansion valve 104. The vehicle air conditioner 100 also includes a fourth pipe 114, which connects the first expansion valve 104 and the gas-liquid separator 106, a fifth pipe 115, which connects the gas-liquid separator 106 and the second expansion valve 105, a sixth pipe 116, which connects the second expansion valve 105 and the second heat exchanger 103, and a seventh pipe 117, which connects the second heat exchanger 103 and the third port 101c. Additionally, the vehicle air conditioner 100 includes an eighth pipe 118, which connects the fourth port 101d and the suction port 11a of the motor-driven compressor 10.

In this structure, the injection pipe 119, which is connected to the injection ports 43, is connected to the gas-liquid separator 106. Additionally, a check valve 120 is located in the injection pipe 119.

The vehicle air conditioner 100 of the present embodiment is capable of performing a cooling operation and a heating operation. More specifically, the vehicle air conditioner 100 includes an air-conditioning ECU 121 that controls the entire vehicle air conditioner 100 including the pipe switch valve 101. The air-conditioning ECU 121 switches the pipe switch valve 101 to the first state, for example, during the cooling operation. In this case, the refrigerant is discharged from the outlet 11b and sent to the first heat exchanger 102. The refrigerant condenses when exchanging heat with external air in the first heat exchanger 102. The condensed refrigerant is reduced in pressure by the first expansion valve 104 and then sent to the gas-liquid separator 106. The refrigerant is separated into liquid and gas by the gas-liquid separator 106. The liquid refrigerant is reduced in pressure by the second expansion valve 105 and then sent to the second heat exchanger 103. The liquid refrigerant evaporates when exchanging heat with the air of the passenger compartment at the second heat exchanger 103. This cools the air in the passenger compartment. The refrigerant evaporated in the second heat exchanger 103 flows toward the suction port 11a of the motor-driven compressor 10. During the cooling operation, the check valve 120 is closed.

The air-conditioning ECU 121 switches the pipe switch valve 101 to the second state, for example, during the heating operation. In this case, the refrigerant is discharged from the outlet 11b and sent to the second heat exchanger 103. The refrigerant condenses when exchanging heat with the air in the passenger compartment at the second heat exchanger 103. This heats the air in the passenger compartment. The refrigerant condensed in the second heat exchanger 103 is reduced in pressure by the second expansion valve 105 and then sent to the gas-liquid separator 106. The refrigerant is separated into fluid and gas in the gas-liquid separator 106. The separated liquid refrigerant is reduced in pressure in the first expansion valve 104 and then sent to the first heat exchanger 102. The refrigerant evaporates when exchanging heat with the external air at the first heat exchanger 102. The evaporated refrigerant flows to the suction port 11a.

The check valve 120 is open during the heating operation. Thus, the gaseous refrigerant, which has been separated by the gas-liquid separator 106, flows to the compression chamber 33 through the injection pipe 119 and the injection ports 43. This increases the flow rate of the refrigerant flowing into the compression chamber 33.

The gaseous fluid separated in the gas-liquid separator 106, which is the refrigerant drawn into the compression chamber 33 through the injection ports 43, has a pressure that is higher than the refrigerant drawn in from the suction port 11a and lower than the refrigerant discharged from the outlet 11b. For the sake of brevity, in the description hereafter, the refrigerant that is drawn in from the suction port 11a is referred to as the intake refrigerant. The refrigerant that is discharged from the outlet 11b is referred to as the compressed refrigerant. The refrigerant that is drawn into the compression chamber 33 from the injection ports 43 is referred to as the intermediate pressure refrigerant. The intake refrigerant corresponds to an "intake fluid." The compressed refrigerant corresponds to a "compressed fluid."

In the vehicle air conditioner 100 having the above structure, after the motor-driven compressor 10 is deactivated, the intermediate pressure fluid remains in the injection pipe 119. The motor-driven compressor 10 of the present embodiment is configured to appropriately discharge the intermediate pressure fluid. The configuration will now be described together with the electrical configuration of the coil 54 of the electric motor 16 and the inverter 55.

Figure 4:
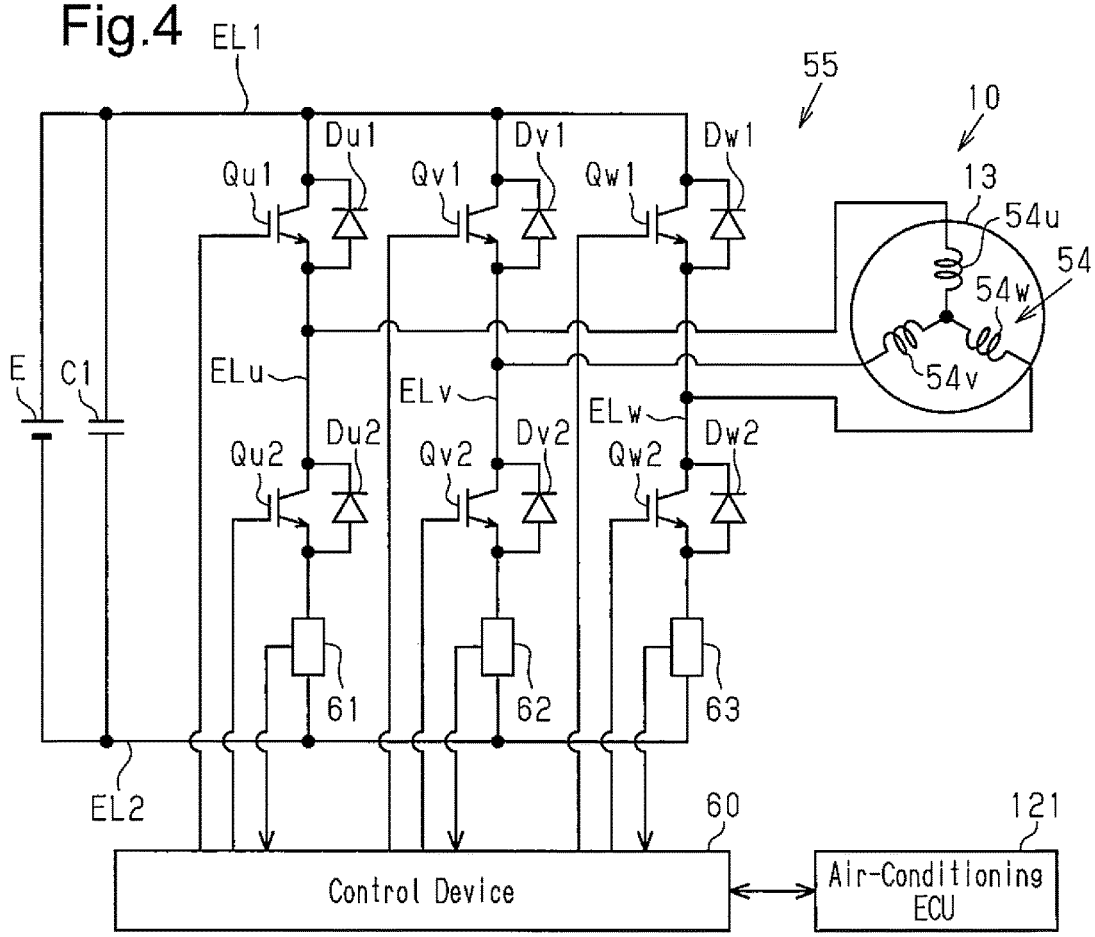
FIG. 4 is a circuit diagram showing the electrical configuration of an inverter.

The electrical configuration between the coil 54 and the inverter 55 will now be described. As shown in FIG. 4, the coil 54 has a three-phase structure including, for example, a u-phase coil 54u, a v-phase coil 54v, and a w-phase coil 54w. Thus, the electric motor 16 is a three-phase motor. The phase coils 54u, 54v, 54w are, for example, Y-connected.

The inverter 55 includes a u-phase upper arm switching element Qu1 and a u-phase lower arm switching element Qu2, which correspond to the u-phase coil 54u. In the same manner, the inverter 55 includes a v-phase upper arm switching element Qv1 and a v-phase lower arm switching element Qv2, which correspond to the v-phase coil 54v, and a w-phase upper arm switching element Qw1 and a w-phase lower arm switching element Qw2, which correspond to the w-phase coil 54w. Thus, the inverter 55 is a so-called three-phase inverter.

The switching elements Qu1, Qu2, Qv1, Qv2, Qw1, Qw2 are each formed, for example, by an IGBT. Instead, a power MOSFET or the like may be used.

The inverter 55 includes two power lines EL1, EL2 that are connected to a DC power supply E installed in the vehicle. The inverter 55 further includes a u-phase wire ELu connected to the power lines EL1, EL2. The u-phase switching elements Qu1, Qu2 are arranged in the u-phase wire ELu and connected in series to each other by the u-phase wire ELu. The portion of the u-phase wire ELu that connects the u-phase switching elements Qu1, Qu2 is connected to the u-phase coil 54u. The DC power supply E is a power storage device such as a battery or an electric double-layer capacitor.

In the same manner, the inverter 55 includes a v-phase wire ELv connected to the power lines EL1, EL2. The v-phase switching elements Qv1, Qv2 are arranged in the v-phase wire ELv. The portion of the v-phase wire ELv that connects the v-phase switching elements Qv1, Qv2 is connected to the v-phase coil 54v. The inverter 55 includes a w-phase wire ELw connected to the power lines EL1, EL2. The w-phase switching elements Qw1, Qw2 are arranged in the w-phase wire ELw. The portion of the w-phase wire ELw that connects the w-phase switching elements Qw1, Qw2 is connected to the w-phase coil 54w.

The inverter 55 includes a smoothing capacitor C1 connected in parallel to the DC power supply E. The inverter 55 also includes flyback diodes Du1 to Dw2 that are connected in parallel to the switching elements Qu1 to Qw2, respectively. The flyback diodes Du1 to Dw2 may be parasitic diodes of the switching elements Qu1 to Qw2. Alternatively, the flyback diodes Du1 to Dw2 may be separate from the switching elements Qu1 to Qw2.

The motor-driven compressor 10 includes a control device 60, which functions as a controller that controls the inverter 55 (more specifically, switching operations of switching elements Qu1 to Qw2) to control the rotation of the rotor 51. The control device 60 is connected to the gates of the switching elements Qu1 to Qw2. The control device 60 may be formed by one or more dedicated hardware circuits and/or one or more processors (control circuitry) that operate in accordance with a computer program (software). A processor includes a CPU and a memory such as a RAM or a ROM. The memory stores program codes or instructions implemented so that the processor executes, for example, the process shown in FIG. 8. The memory, that is, a computer readable medium, includes any usable medium that is accessible using a versatile or dedicated computer.

The control device 60 performs PWM control on the inverter 55. More specifically, the control device 60 uses a carrier signal (transport wave signal) and an instruction voltage signal (comparison signal) to generate a control signal. The control device 60 uses the generated control signal to cyclically apply a voltage having a predetermined pulse width δT to each of the switching elements Qu1 to Qw2. This cyclically activates and deactivates each of the switching elements Qu1 to Qw2. Consequently, DC power of the DC power supply E is converted into AC power. The AC power is supplied to the electric motor 16 to drive, or generate rotation, with the electric motor 16. The control device 60 is configured to be capable of changing the pulse width δT, that is, the activation/deactivation duty ratio for each of the switching elements Qu1 to Qw2.

When activating the motor-driven compressor 10, the control device 60 recognizes the rotation position (rotation angle) where the rotor 51 that is still is located and controls the switching elements Qu1 to Qw2 to rotate the rotor 51 based on the recognition result. More specifically, the rotor 51 needs to be still when activating the motor-driven compressor 10. Any specific structure may be used to recognize the rotation position of the rotor 51.

The control device 60 is configured to be capable of recognizing phase currents Iu, Iv, Iw that flow to the phase coils 54u, 54v, 54w as the current flowing to the electric motor 16. More specifically, as shown in FIG. 4, the inverter 55 includes current sensors 61 to 63, which function as current detectors that respectively detect the current flowing through the phase wires ELu to ELw. The current sensors 61 to 63 are located, for example, between the second power line EL2 and the lower arm switching elements Qu2 to Qw2 of the respective phase wires ELu to ELw. The current sensors 61 to 63 transmit the detection results to the control device 60. The control device 60 is capable of recognizing u-phase current Iu, which is the current flowing to the u-phase coil 54u, v-phase current Iv, which is the current flowing to the v-phase coil 54v, and w-phase current Iw, which is the current flowing to the w-phase coil 54w, based on the detection results of the current sensors 61 to 63.

The current sensors 61 to 63 may have any specific configuration. For example, when the configuration includes a shunt resistor, the phase currents Iu to Iw may be estimated from the voltage applied to the shunt resistor.

The control device 60 and the air-conditioning ECU 121 are electrically connected to each other and capable of exchanging information with each other. The control device 60 activates or deactivates the motor-driven compressor 10 in response to a request, an abnormality determination result, or the like received from the air-conditioning ECU 121. The deactivation of the motor-driven compressor 10 refers to a condition in which the supply of AC power to the electric motor 16 is stopped, more specifically, when all of the switching elements Qu1 to Qw2 are deactivated.

After a predetermined waiting period elapses from the deactivation of the motor-driven compressor 10, the control device 60 of the present embodiment executes a recognition process that recognizes the rotation direction of the rotor 51 and the rotational frequency R, or the rotation speed, of the rotor 51 based on the detection results of the current sensors 61 to 63. The control device 60 that executes the recognition process corresponds to a "recognition unit."

More specifically, the control device 60 maintains the upper arm switching elements Qu1, Qv1, Qw1, which are located at a side not corresponding to the current sensors 61 to 63, in the deactivation state, while the control device 60 cyclically activates and deactivates the lower arm switching elements Qu2, Qv2, Qw2, which are located at a side corresponding to the current sensors 61 to 63, using a predetermined switching pattern. In the present embodiment, the lower arm switching elements Qu2, Qv2, Qw2 are subject to the switching (i.e., activation/deactivation) and correspond to "subject arm switching elements of the three phases."

The control device 60 controls, for example, the lower arm switching elements Qu2, Qv2, Qw2 using a switching pattern (hereafter, referred to as the one-phase pattern) in which the lower arm switching elements Qu2, Qv2, Qw2 of the three phases are sequentially activated one phase at a time in a predetermined order and that includes a mode in which the lower arm switching element of one phase is activated, while the lower arm switching elements of the remaining two phases are deactivated. In the present embodiment, as shown in (a) to (c) of FIG. 5, the one-phase pattern switches the lower arm switching element that is activated in order from the u-phase lower arm switching element Qu2 to the v-phase lower arm switching element Qv2 and then the w-phase lower arm switching element Qw2.

A mode having the combination of Qu2 being activated while Qu1, Qv1, Qw1, Qv2, Qw2 being deactivated is referred to as the first mode. A mode having the combination of Qv2 being activated while Qu1, Qv1, Qw1, Qu2, Qw2 being deactivated is referred to as the second mode. In this case, the control device 60 switches from the first mode to the second mode by cyclically activating and deactivating the lower arm switching elements Qu2, Qv2, Qw2. In other words, the switching mode used in the deceleration control (one-phase pattern) includes the first mode and the second mode, which have different combinations of the activated and deactivated switching elements Qu1 to Qw2.

The one-phase pattern is a switching pattern that is set so that among the lower arm switching elements Qu2, Qv2, Qw2 of the three phases, the lower arm switching elements of multiple phases (two phases or three phases) are not simultaneously activated.

Figure 5:
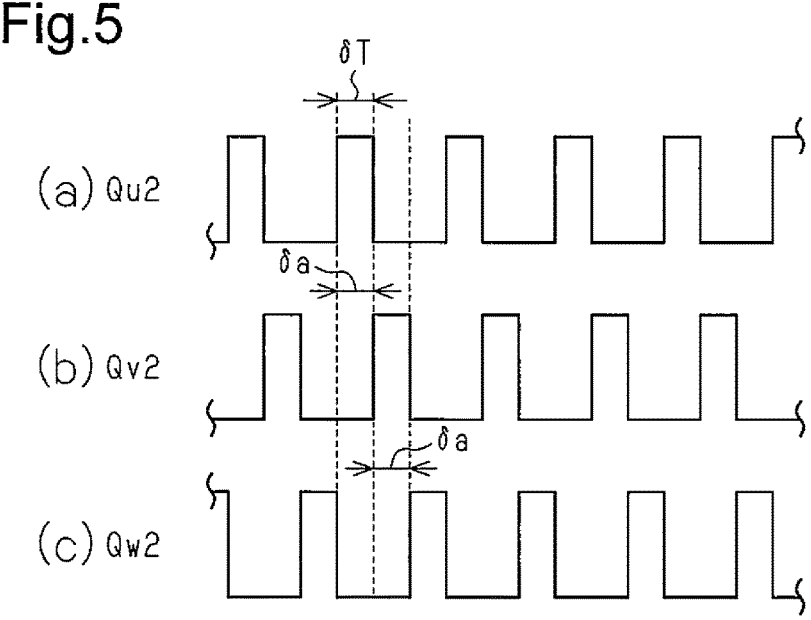
FIG. 5 is a time chart showing lower arm switching elements in a one-phase pattern in which (a) shows activation and deactivation of a u-phase lower arm switching element, (b) shows activation and deactivation of a v-phase lower arm switching element, and (c) shows activation and deactivation of a w-phase lower arm switching element.

The one-phase pattern is not limited to the switching pattern in which the lower arm switching element of any one of the three phases is constantly activated as shown in (a) to (c) of FIG. 5 and may include an interval period during which the lower arm switching elements Qu2, Qv2, Qw2 are all deactivated. The one-phase pattern may be a switching pattern in which, for example, the lower arm switching elements are sequentially activated one phase at a time in a predetermined order between the above interval periods and the lower arm switching element of one phase is activated, while the lower arm switching elements of the remaining two phases are deactivated.

In the present embodiment, the lower arm switching elements Qu2, Qv2, Qw2 rise to the activation state at different timings that are separated from each other by a predetermined period δa. More specifically, the period from when the lower arm switching element Qu2 rises to when the lower arm switching element Qv2 rises, the period from when the lower arm switching element Qv2 rises to when the lower arm switching element Qw2 rises, and the period from when the lower arm switching element Qw2 rises to when the lower arm switching element Qu2 rises are the same predetermined period δa. In this configuration, the one-phase pattern is a switching pattern in which the pulse width δT is set to be less than or equal to the predetermined period δa. When the pulse width δT is less than the predetermined period δa, the one-phase pattern is a switching pattern in which the lower arm switching elements are sequentially activated one phase at a time in the predetermined order between the interval periods (three-phase deactivation periods). When the pulse width δT is equal to the predetermined period δa, the one-phase pattern is a switching pattern in which the lower arm switching elements are sequentially activated one phase at a time in the predetermined order without the interval period.

The relationship between the rotation direction and the rotational frequency R of the rotor 51 and the phase currents Iu, Iv, Iw will now be described with reference to FIGS. 6 and 7.

Figure 6:
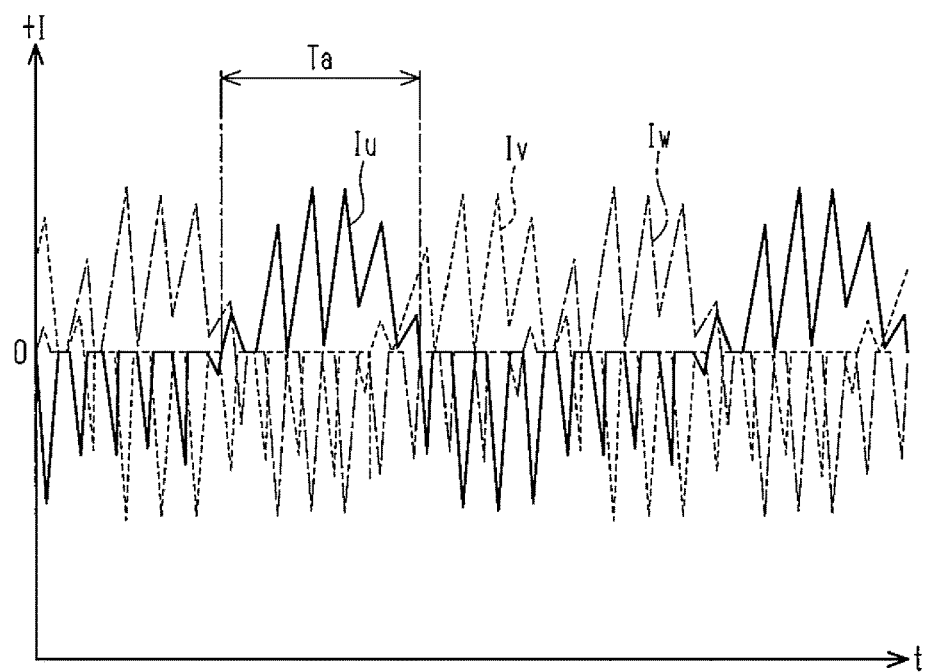
FIG. 6 is a schematic graph showing each phase current when a rotor rotates in a forward direction.

FIG. 6 is a schematic graph showing the phase currents Iu, Iv, Iw detected when the rotor 51 is rotating in the forward direction. FIG. 7 is a schematic graph showing the phase currents Iu, Iv, Iw detected when the rotor 51 is rotating in the reverse direction. To facilitate illustration, in FIGS. 6 and 7, a cycle of a minimal unit wave (single triangle wave) of each of the phase currents Iu, Iv, Iw is elongated from the actual cycle.

Figure 7:
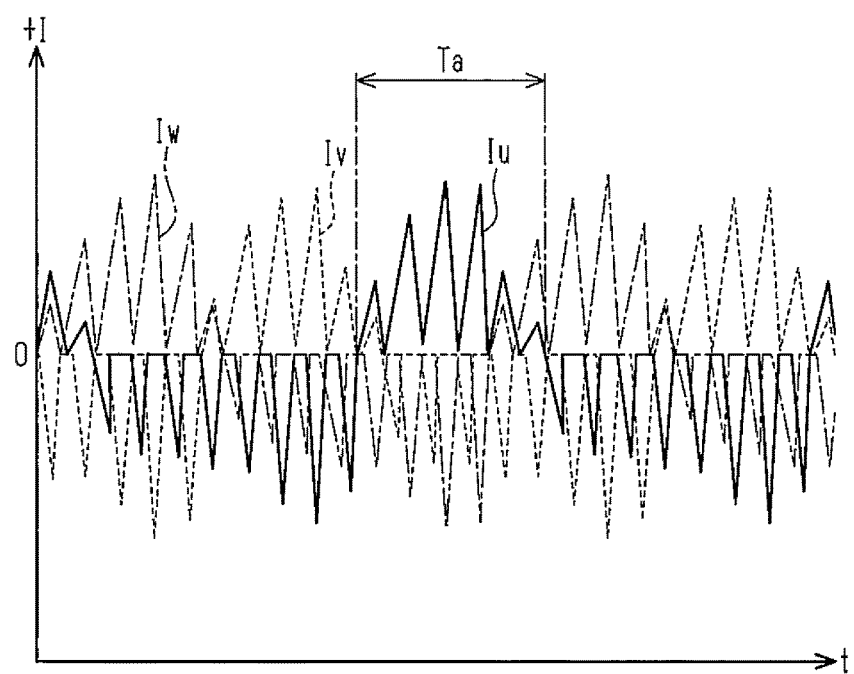
FIG. 7 is a schematic graph showing each phase current when the rotor rotates in a direction opposite to the forward direction.

FIGS. 6 and 7 show the current waveforms of the phase currents Iu, Iv, Iw when the lower arm switching elements Qu2, Qv2, Qw2 are constantly activated and deactivated. Thus, the actual switching of the lower arm switching elements Qu2, Qv2, Qw2 in the one-phase pattern obtains one-third of the number of triangle waves that are formed by the phase currents Iu, Iv, Iw shown in FIGS. 6 and 7.

As shown in FIGS. 6 and 7, the phase currents Iu, Iv, Iw (more specifically, envelopes of phase currents Iu, Iv, Iw) have different phases. Thus, a phase current having a positive value sequentially shifts as time elapses. A phase current has a positive value when the phase coil corresponding to the phase current having the positive value generates smaller counter-electromotive force than the other phase coils.

The shifting order of the phase current having a positive value differs between when the rotor 51 is rotating in the forward direction and when the rotor 51 is rotating in the reverse direction. More specifically, as shown in FIG. 6, when the rotor 51 is rotating in the forward direction, the phase current having a positive value shifts in order from the u-phase current Iu to the v-phase current Iv and then the w-phase current Iw. However, as shown in FIG. 6, when the rotor 51 is rotating in the reverse direction, the phase current having a positive value shifts in order from the w-phase current Iw to the v-phase current Iv and then the u-phase current Iu.

A positive current period Ta during which the phase current has a positive value corresponds to one-third of one cycle of the electrical angle of the rotor 51.

The control device 60 recognizes the rotation direction and the rotational frequency R of the rotor 51 based on the above properties and the current waveforms obtained from the detection results of the current sensors 61 to 63 when the lower arm switching elements Qu2, Qv2, Qw2 are switched in the one-phase pattern.

More specifically, when the lower arm switching elements Qu2, Qv2, Qw2 are switched in the one-phase pattern, current waveforms of the phase currents Iu, Iv, Iw are obtained in correspondence with the present rotation direction and the present rotational frequency R. The control device 60 recognizes the shifting order of the phase current having a positive value from the current waveforms. The control device 60 determines whether the rotation direction of the rotor 51 is forward or reverse based on the recognition results.

The control device 60 recognizes the positive current period Ta from the current waveforms obtained by switching in the one-phase pattern. The control device 60 derives the rotational frequency R of the rotor 51 based on the recognized positive current period Ta.

The above properties do not change even when the switching pattern of the lower arm switching elements Qu2, Qv2, Qw2 changes. More specifically, the properties include an aspect such that the shifting order of the phase current having a positive value differs in accordance with the rotation direction and an aspect such that the positive current period Ta corresponds to one-third of one cycle of the rotor 51. Thus, even when the lower arm switching elements Qu2, Qv2, Qw2 are switched in a two-phase pattern, the control device 60 recognizes the rotation direction and the rotational frequency R of the rotor 51 based on the above properties and the current waveforms obtained from the current sensors 61 to 63. The detail of the two-phase pattern will be described later.

In response to being recognizing that the rotor 51 is rotating in the reverse direction through the recognition process, the control device 60 executes a reverse rotation control process that controls the rotational frequency of the rotor 51 that is rotating in the reverse direction. The reverse rotation control process will now be described.

Figure 8:
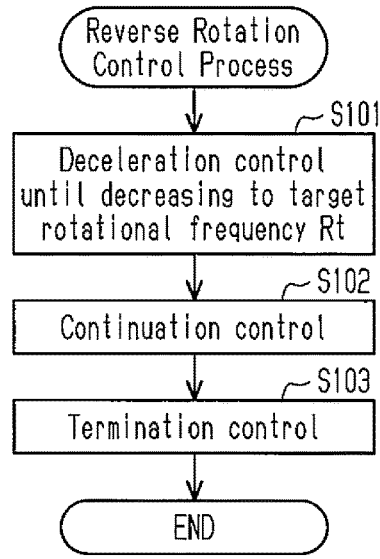
FIG. 8 is a flowchart of a reverse rotation control process.

As shown in FIG. 8, in step S101, the control device 60 executes a deceleration control that decreases the rotational frequency R to a target rotational frequency Rt. The control device 60 that executes the process of step S101 corresponds to a "deceleration controller."

The target rotational frequency Rt is set to be less than or equal to a predetermined rotational frequency tolerance Ra. More specifically, when the rotor 51 is reversely rotating, the motor-driven compressor 10 generates noise, vibration, or the like. The noise and the vibration tend to increase as the rotational frequency R increases. In this aspect, the rotational frequency tolerance Ra is the maximum value at which the noise and the vibration are allowed.

The deceleration control of the present embodiment will now be described in detail. In the deceleration control, the control device 60 decelerates the rotor 51 by activating at least one of the switching elements Qu1 to Qw2. In the present embodiment, in the deceleration control, the control device 60 cyclically activates and deactivates the lower arm switching elements Qu2, Qv2, Qw2 at a predetermined switching pattern to sequentially switch the lower arm switching element that is activated. More specifically, in the deceleration control, the control device 60 uses a switching control mode that switches (activates/deactivates) the lower arm switching elements Qu2, Qv2, Qw2 to sequentially switch the lower arm switching element that is activated. The sequential switching of the lower arm switching element that is activated indicates that the combination of the activated and deactivated switching elements Qu1 to Qw2 (more specifically, the lower arm switching elements Qu2, Qv2, Qw2) is sequentially changed.

In this case, the lower arm switching elements Qu2, Qv2, Qw2 are set to have the same switching frequency.

In this configuration, when the positive phase current corresponds to the lower arm switching element that is activated, heat is generated in the phase coil corresponding to the lower arm switching element that is activated. This converts kinetic energy of the rotor 51 into thermal energy and decelerates the rotor 51. In the description hereafter, the effect that decelerates the rotor 51 by converting the kinetic energy of the rotor 51 into thermal energy is referred to as the brake effect.

The phase current and the phase coil that correspond to the lower arm switching element that is activated refer to the u-phase current Iu and the u-phase coil 54u when the u-phase lower arm switching element Qu2 is activated. In the same manner, the v-phase current Iv and the v-phase coil 54v are referred to when the v-phase lower arm switching element Qv2 is activated. The w-phase current Iw and the w-phase coil 54w are referred to when the w-phase lower arm switching element Qw2 is activated.

In this configuration, as the phase currents Iu, Iv, Iw increase, heat tends to be generated. This increases the brake effect. More specifically, as the phase currents Iu, Iv, Iw increase, a larger deceleration force tends to be applied to the rotor 51.

The counter-electromotive force generated in the phase coils 54u, 54v, 54w increases as the rotational frequency R increases. Additionally, the phase currents Iu, Iv, Iw increase more easily as the counter-electromotive force increases. Thus, the phase currents Iu, Iv, Iw are dependent on the rotational frequency R.

In this regard, the control device 60 starts the deceleration control by cyclically activating and deactivating the lower arm switching elements Qu2, Qv2, Qw2 using a predetermined initial deceleration duty ratio and a predetermined initial deceleration switching pattern. In the present embodiment, the initial switching pattern is the one-phase pattern. The initial deceleration duty ratio is set in accordance with a predetermined tolerance value and the counter-electromotive force generated when the rotational frequency R is the expected maximum value so that the phase currents Iu, Iv, Iw flowing because of the switching in the one-phase pattern do not exceed the tolerance value when the rotational frequency R is the maximum value that is expected under a situation in which the intermediate pressure refrigerant causes reverse rotation. More specifically, the initial deceleration duty ratio and the initial switching pattern are set so that the phase currents Iu, Iv, Iw do not exceed the tolerance value regardless of the rotational frequency R of the rotor 51. The tolerance value is, for example, the rated current value of the switching elements Qu1 to Qw2 or a value that is lower than the rated current value by a predetermined margin.

Then, the control device 60 variably controls at least one of the switching pattern and the activation/deactivation duty ratio of the lower arm switching elements Qu2, Qv2, Qw2 so that the phase currents Iu, Iv, Iw increase within a range that does not exceed the tolerance value based on the detection results of the phase currents Iu, Iv, Iw. The control device 60, for example, gradually increases the duty ratio from the initial deceleration duty ratio so that the phase currents Iu, Iv, Iw do not exceed the tolerance value.

As described above, in the switching pattern of the present embodiment, the lower arm switching elements Qu2, Qv2, Qw2 rise to the activation state at different timings that are separated from each other by a predetermined period δa. More specifically, the period from when the lower arm switching element Qu2 rises to when the lower arm switching element Qv2 rises, the period from when the lower arm switching element Qv2 rises to when the lower arm switching element Qw2 rises, and the period from when the lower arm switching element Qw2 rises to when the lower arm switching element Qu2 rises are the same predetermined period δa. When the duty ratio increases and the pulse width δT of each of the lower arm switching elements Qu2, Qv2, Qw2 becomes greater than the predetermined period δa, the switching pattern is switched from the one-phase pattern to the two-phase pattern.

Figure 9:
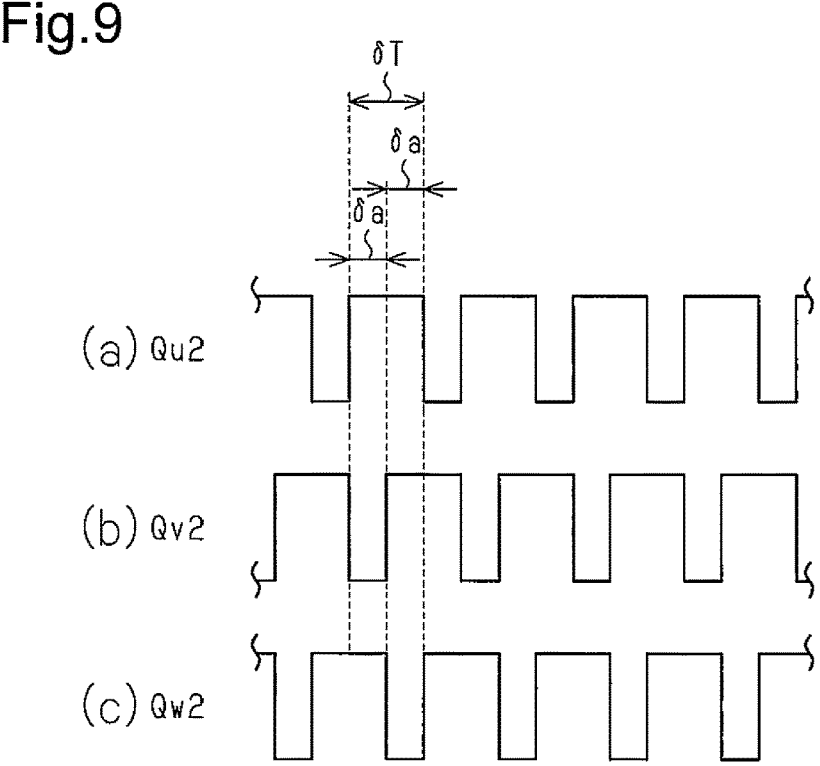
FIG. 9 is a time chart showing the lower arm switching elements in a two-phase pattern in which (a) shows activation and deactivation of the u-phase lower arm switching element, (b) shows activation and deactivation of the v-phase lower arm switching element, and (c) shows activation and deactivation of the w-phase lower arm switching element.

As shown in (a) to (c) of FIG. 9, the two-phase pattern is a switching pattern in which the lower arm switching elements Qu2, Qv2, Qw2 of the three phases are sequentially activated two phases at a time in a predetermined order and that includes a mode in which the lower arm switching elements of two phases are activated, while the lower arm switching element of the remaining phase is deactivated. In the two-phase pattern, the lower arm switching elements that are activated are switched, for example, in the order of the u-phase lower arm switching element Qu2 and the v-phase lower arm switching element Qv2, the v-phase lower arm switching element Qv2 and the w-phase lower arm switching element Qw2, the w-phase lower arm switching element Qw2 and the u-phase lower arm switching element Qu2, and so on. In the two-phase pattern of the present embodiment, the upper arm switching elements Qu1, Qv1, Qw1 all remain in the deactivation state.

For example, a mode having the combination of Qu2, Qv2 being activated while Qu1, Qv1, Qw1, Qw2 being deactivated is referred to as the first mode. A mode having the combination of Qv2, Qw2 being activated while Qu1, Qv1, Qw1, Qu2 being deactivated is referred to as the second mode. In this case, the control device 60 switches from the first mode to the second mode by cyclically activating and deactivating the lower arm switching elements Qu2, Qv2, Qw2. In other words, the switching mode used in the deceleration control (two-phase pattern) includes the first mode and the second mode, which have different combinations of the activated and deactivated switching elements Qu1 to Qw2.

The two-phase pattern is not limited to the switching pattern in which the lower arm switching elements of any two of the three phases are constantly activated as shown in (a) to (c) of FIG. 9 and may include a one-phase activation period in which the lower arm switching element of one phase is activated while the lower arm switching elements of the two phases are deactivated. The two-phase pattern may be a switching pattern in which switching occurs in the order of, for example, Qu2 is activated while Qv2, Qw2 are deactivated; Qu2, Qv2 are activated while Qw2 is deactivated; Qv2 is activated while Qu2, Qw2 are deactivated; Qv2, Qw2 are activated while Qu2 is deactivated; Qw2 is activated while Qu2, Qv2 are deactivated; Qu2, Qw2 are activated while Qv2 is deactivated; and so on. Thus, the two-phase pattern may be a switching pattern in which the lower arm switching elements are sequentially activated two phases at a time in a predetermined order between one-phase activation periods (two-phase deactivation periods).

The two-phase pattern may include a three-phase activation period during which the lower arm switching elements Qu2, Qv2, Qw2 are all activated. The two-phase pattern may be a switching pattern in which switching occurs in the order of, for example, Qu2, Qv2 are activated while Qw2 is deactivated; Qu2, Qv2, Qw2 are activated; Qv2, Qw2 are activated while Qu2 is deactivated; Qu2, Qv2, Qw2 are activated; Qu2, Qw2 are activated while Qv2 is deactivated; Qu2, Qv2, Qw2 are activated; Qu2, Qv2 are activated while Qw2 is deactivated; and so on. Thus, the two-phase pattern may be a switching pattern in which the lower arm switching elements are sequentially activated two phases at a time in a predetermined order between the three-phase activation periods.

When the pulse width δT of each of the lower arm switching elements Qu2, Qv2, Qw2 is less than twice the predetermined period δa, the two-phase pattern is a switching pattern in which the lower arm switching elements are sequentially activated two phases at a time in the predetermined order between the one-phase activation periods. When the pulse width δT of each of the lower arm switching elements Qu2, Qv2, Qw2 is greater than twice the predetermined period δa, the two-phase pattern is a switching pattern in which the lower arm switching elements are sequentially activated two phases at a time in the predetermined order between the three-phase activation periods. When the pulse width δT of each of the lower arm switching elements Qu2, Qv2, Qw2 is equal to twice the predetermined period δa, the two-phase pattern is a switching pattern in which the lower arm switching elements are sequentially activated two phases at a time in the predetermined order without the one-phase activation period and the three-phase activation period. The brake effect tends to increase as the duty ratio increases.

When the lower arm switching elements Qu2, Qv2, Qw2 are configured to be switched in the two-phase pattern, a mode is used in which the lower arm switching elements of two phases are simultaneously activated. Thus, the lower arm switching element corresponding to the phase current having a positive value is activated at a switching frequency of two out of three times under the mode. Therefore, the two-phase pattern increases the phase currents Iu, Iv, Iw more easily than the one-phase pattern.

After the switching pattern is switched from the one-phase pattern to the two-phase pattern, the control device 60 further gradually increases the duty ratio in a range such that the phase currents Iu, Iv, Iw do not exceed the tolerance value.

The phase currents Iu, Iv, Iw are dependent on the rotational frequency R. Thus, during deceleration in which the rotational frequency R is gradually decreased, the actual phase currents Iu, Iv, Iw do not always increase even when the switching pattern and the duty ratio are variably controlled to easily increase the phase currents in a gradual manner. More specifically, the variable control of the switching pattern and the duty ratio that function to increase the phase currents Iu, Iv, Iw in a gradual manner does not necessarily increase the actual phase currents Iu, Iv, Iw and only needs to limit decreases in the phase currents Iu, Iv, Iw in accordance with the deceleration.

The control device 60 recognizes the present rotational frequency R of the rotor 51 from waveforms of the phase currents Iu, Iv, Iw obtained by the deceleration control. The control device 60 continues the deceleration control until the rotational frequency R becomes the target rotational frequency Rt and terminates the deceleration control when the rotational frequency R becomes the target rotational frequency Rt. The time when execution of the process of step S101 is started corresponds to the time when the deceleration control is started. The time when the rotational frequency R becomes the target rotational frequency Rt corresponds to the time when the deceleration control is terminated. The control device 60 stores a first period T1, which is the execution period of the deceleration control. The first period T1 varies in accordance with the state during the deactivation.

As shown in FIG. 8, when the rotational frequency R decreases to the target rotational frequency Rt, the control device 60 proceeds to step S102 and executes a continuation control that continues the reverse rotation of the rotor 51. The control device 60 that executes the process of step S102 corresponds to a "continuation controller."

In the continuation control, the control device 60 controls the inverter 55 so that the rotational frequency R is maintained at the target rotational frequency Rt. More specifically, the control device 60 starts the continuation control by cyclically activating and deactivating the lower arm switching elements Qu2, Qv2, Qw2 using a predetermined initial continuation switching pattern and a predetermined initial continuation duty ratio. In the present embodiment, the initial continuation switching pattern and the initial continuation duty ratio are a switching pattern and a duty ratio that are set when the deceleration control is terminated.

The intermediate pressure refrigerant is discharged during the reverse rotation of the rotor 51. The discharging of the intermediate pressure refrigerant decreases the pressure of the intermediate pressure refrigerant in the injection pipe 119. This reduces kinetic energy that reversely rotates the rotor 51. Thus, when the switching control continues in the same mode, the rotational frequency R gradually decreases due to the reduction in the kinetic energy corresponding to the reverse rotation of the rotor 51.

In this regard, in the present embodiment, the control device 60 variably controls at least one (in present embodiment, both) of the switching pattern and the duty ratio so that the phase currents Iu, Iv, Iw gradually decrease. More specifically, the control device 60 gradually decreases the duty ratio so that the rotational frequency R is maintained at the target rotational frequency Rt. Additionally, when the switching pattern is the two-phase pattern and the duty ratio becomes a lower limit value corresponding to the two-phase pattern, the control device 60 switches the switching pattern to the one-phase pattern and further gradually decreases the duty ratio.

In this configuration, thermal energy consumed by the electric motor 16 decreases in correspondence with the decrease in the kinetic energy resulting from the discharge of the intermediate pressure refrigerant. This tends to maintain the rotational frequency R at the target rotational frequency Rt.

The control device 60 recognizes the present rotational frequency R from waveforms of the phase currents Iu, Iv, Iw obtained by the continuation control and performs feedback control on the switching pattern and the duty ratio so that the obtained rotational frequency R becomes close to the target rotational frequency Rt. More specifically, during the continuation control, the control device 60 controls the phase currents Iu, Iv, Iw in accordance with changes in the pressure of the intermediate pressure refrigerant in the injection pipe 119 so that the rotational frequency R becomes close to the target rotational frequency Rt.

The control device 60 executes the continuation control during a second period T2 that is longer than the first period T1, which is the execution period of the deceleration control.

More specifically, during the continuation control, the control device 60 regularly determines whether or not a predetermined continuation control termination condition is satisfied. The continuation control termination condition includes, for example, both condition (A) in which the execution period of the continuation control (i.e., second period T2) is longer than the first period T1 and condition (B) in which the phase currents Iu, Iv, Iw are less than or equal to a predetermined termination trigger current value.

The termination trigger current value is set in correspondence with a state in which the intermediate pressure refrigerant has been sufficiently discharged from the injection pipe 119, in other words, a state in which after being stopped, the rotor 51 will not be moved by the intermediate pressure refrigerant. More specifically, the control device 60 includes map data in which the switching control modes (more specifically, switching pattern and duty ratio) are associated with the termination trigger current values. Each termination trigger current value corresponds to the phase currents Iu, Iv, Iw obtained when the pressure of the residual intermediate pressure refrigerant in the injection pipe 119 is a predetermined tolerance pressure value during execution of the switching control associated with the termination trigger current value.

The control device 60 recognizes the termination trigger current value corresponding to the present switching control mode by referring to the map data and determines whether or not the phase currents Iu, Iv, Iw that flow because of the switching control are less than or equal to the termination trigger current value. When the phase currents Iu, Iv, Iw are less than or equal to the termination trigger current value, the control device 60 determines that condition (B) is satisfied.

The control device 60 continues the execution of the continuation control until the continuation control termination condition is satisfied.

When the continuation control termination condition is satisfied, the control device 60 proceeds to step S103 and executes a deactivation control that stops the rotor 51. More specifically, the control device 60 maintains all of the lower arm switching elements Qu2, Qv2, Qw2 in the activation state. That is, the control device 60 short-circuits all of the phase coils 54u, 54v, 54w. The deactivation control may be referred to as the deceleration control in which the lower arm switching elements Qu2, Qv2, Qw2 of the three phases are all set to the activation state and the duty ratio is set to 100%.

Figure 10:
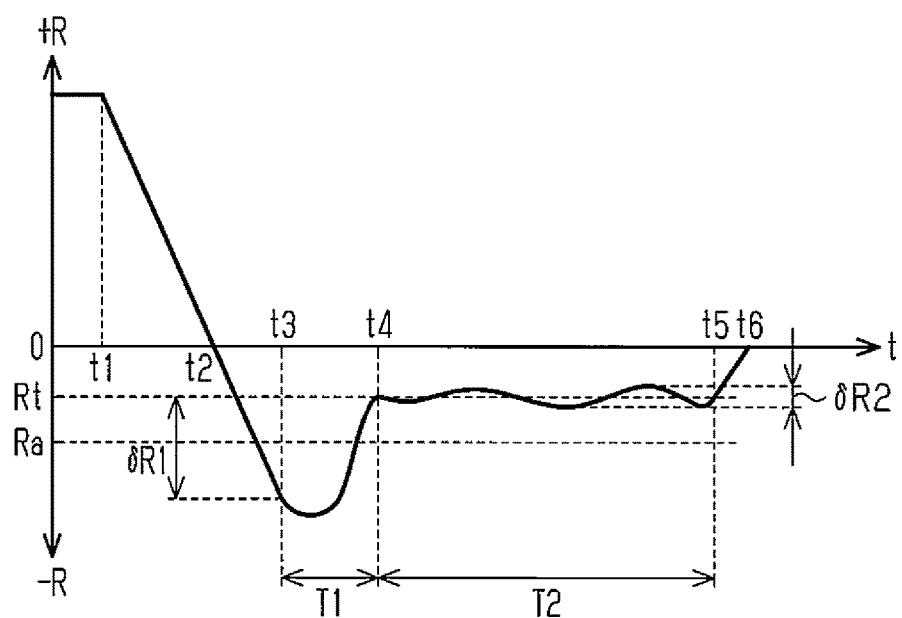
FIG. 10 is a graph showing changes in the rotational frequency of the rotor subsequent to deactivation.

The operation of the present embodiment will now be described with reference to FIG. 10. FIG. 10 is a schematic graph showing changes in the rotational frequency R subsequent to the deactivation. In FIG. 10, "+" denotes the forward rotation, and "−" denotes the reverse rotation.

As shown in FIG. 10, at time t1, when the motor-driven compressor 10 is deactivated, the rotational frequency R of the rotor 51 gradually decreases. At time t2, the rotation direction of the rotor 51 is switched from the forward direction to the reverse direction. Subsequently, the rotational frequency R becomes greater than the target rotational frequency Rt and the rotational frequency tolerance Ra.

At time t3, the recognition process is executed. When the reverse rotation of the rotor 51 is recognized, the deceleration control is started. Consequently, the kinetic energy is converted into thermal energy, and the rotor 51 starts to decelerate. In this case, as described above, the brake effect gradually increases. Thus, the deceleration rate of the rotational frequency R gradually increases.

At time t4, when the rotational frequency R becomes equal to the target rotational frequency Rt, the deceleration control is switched to the continuation control. In this case, the first period T1 is from time t3 to time t4. The difference in the rotational frequency R between time t3, which is the start time of the deceleration control, and time t4, which is the termination time of the deceleration control, is referred to as a deceleration rotational frequency difference δR1 (deceleration rotation speed difference).

During the continuation control, the rotational frequency R is maintained at the target rotational frequency Rt. In this case, the actual rotational frequency R does not completely conform to the target rotational frequency Rt and slightly fluctuates. However, a continuation rotational frequency difference δR2 (continuation rotation speed difference), which is the difference between the minimum value and the maximum value of the rotational frequency R during the continuation control, is sufficiently smaller than the deceleration rotational frequency difference δR1. The continuation rotational frequency difference δR2 corresponds to the fluctuation difference of the rotational frequency R of the rotor 51 during the continuation control.

At time t5, when the continuation control termination condition is satisfied, the switching control is switched from the continuation control to the termination control. At time t6, the reverse rotation of the rotor 51 stops. In this case, the second period T2 is from time t4 to time t5.

The present embodiment has the advantages described below.

(1) The motor-driven compressor 10 includes the electric motor 16 including the rotor 51, the housing 11, which is provided with the suction port 11a that draws in the refrigerant functioning as a fluid, and the compression unit 15, which compresses the intake refrigerant that is drawn in from the suction port 11a and discharges the compressed refrigerant. The compression unit 15 includes the fixed scroll 31, which is fixed to the housing 11, the movable scroll 32, which is engaged with the fixed scroll 31 and capable of orbiting the fixed scroll 31, and the compression chamber 33 defined by the fixed scroll 31 and the movable scroll 32. The compression unit 15 is configured to compress the intake refrigerant, which is drawn into the compression chamber 33, when the movable scroll 32 orbits in the forward direction as the rotor 51 rotates in the forward direction.

In this configuration, the motor-driven compressor 10 includes the injection ports 43, which draw the intermediate pressure refrigerant having a pressure that is higher than the intake refrigerant and lower than the compressed refrigerant into the compression chamber 33, the inverter 55, which drives the electric motor 16, and the control device 60, which controls the inverter 55. The control device 60 executes the deceleration control, which decelerates the rotor 51, during the first period T1 in response to the rotor 51 being rotating in a direction reverse to the forward direction. After terminating the deceleration control, the control device 60 executes the continuation control, which continues the reverse rotation of the rotor 51, during the second period T2, which is longer than the first period T1. The continuation rotational frequency difference δR2 (continuation rotation speed difference), which is the difference between the maximum value and the minimum value of the rotational frequency R (rotation speed) of the rotor 51 obtained during the continuation control, is smaller than the deceleration rotational frequency difference δR1 (deceleration rotation speed difference), which is the difference in the rotational frequency R between the start time of the deceleration control and the termination time of the deceleration control.

In this configuration, when the rotor 51 is reversely rotating, the rotor 51 is decelerated during the first period T1. Then, the reverse rotation of the rotor 51 continues at a relatively low rotational frequency R during the second period T2, which is longer than the first period T1. Thus, the intermediate pressure refrigerant is discharged while limiting noise and vibration.

More specifically, noise and vibration tend to increase as the rotational frequency R increases. Thus, if the high rotational frequency R continues for a long time, noise and vibration may be annoying. However, if the rotor 51 is forcibly and quickly stopped, the intermediate pressure refrigerant continues to remain in the injection pipe 119. This may cause the reverse rotation recurrence action in which after the rotation of the rotor 51 is stopped, the rotor 51 reversely rotates again. The reverse rotation recurrence action displaces the rotation position of the rotor 51 and may interfere with the activation of the motor-driven compressor 10 in which the switching elements Qu1 to Qw2 are controlled based on the rotation position of the rotor 51.

In this regard, in the present embodiment, the deceleration control is first performed. Then, when the rotational frequency R is decreased, the continuation control is performed. In the continuation control, the fluctuation of the rotational frequency R is small compared to the deceleration control. This allows the continuation control to easily maintain the reverse rotation of the rotor 51 at a relatively low rotational frequency R. Thus, the noise and the vibration are limited during the continuation control. Additionally, the continuation control is performed during the second period T2, which is longer than the first period T1. This appropriately discharges the intermediate pressure refrigerant. Additionally, the first period T1, which is the execution period of the deceleration control corresponding to a relatively high rotational frequency R, is shorter than the second period T2. Thus, the noise and the vibration may not be annoying. Therefore, occurrences of the reverse rotation recurrence action are limited while limiting the noise and the vibration. This limits the interference with the activation of the motor-driven compressor 10 that is caused by the intermediate pressure refrigerant.

(2) In the deceleration control, the control device 60 decelerates the rotor 51 until the rotational frequency R of the rotor 51 becomes the target rotational frequency Rt, which is set to be less than or equal to the predetermined rotational frequency tolerance Ra. In the continuation control, the control device 60 continues the rotation of the rotor 51 during the second period T2 while maintaining the rotational frequency R at the rotational frequency tolerance Ra or lower. In this configuration, during the continuation control, the rotational frequency R is less than or equal to the rotational frequency tolerance Ra. This limits the noise and the vibration in a further favorable manner.

(3) In the continuation control, the control device 60 controls the inverter 55 so that the rotational frequency R is maintained at the target rotational frequency Rt. In this configuration, the rotational frequency R is maintained at a high level compared to a configuration that gradually decreases the rotational frequency R from the target rotational frequency Rt. This facilitates the discharging of the intermediate pressure refrigerant and promptly discharges the intermediate pressure refrigerant. Consequently, the second period T2 may be shortened. This shortens the period until the rotor 51 is stopped.

(4) The inverter 55 includes the upper arm switching elements Qu1, Qv1, Qw1 and the lower arm switching elements Qu2, Qv2, Qw2, in which those of the same phase are connected to each other. The control device 60 controls the switching elements Qu1 to Qw2. In the deceleration control, the control device 60 sequentially switches the lower arm switching element that is activated by cyclically activating and deactivating the lower arm switching elements Qu2, Qv2, Qw2 while maintaining the upper arm switching elements Qu1, Qv1, Qw1 in the deactivation state.

In this configuration, when the phase current flows in correspondence with the lower arm switching element that is activated, the kinetic energy of the rotor 51 is converted into thermal energy. This decelerates the rotor 51.

The lower arm switching elements Qu2, Qv2, Qw2 may be maintained in the activation state without being cyclically activated and deactivated. However, if the lower arm switching elements Qu2, Qv2, Qw2 are maintained in the activation state, the phase currents Iu, Iv, Iw would excessively increase and exceed the tolerance value. In this regard, in the present embodiment, the lower arm switching elements Qu2, Qv2, Qw2 are configured to be cyclically activated and deactivated. This limits excessive increases in the phase currents Iu, Iv, Iw.

Additionally, in the present embodiment, the lower arm switching element that is activated is sequentially switched. Thus, the phase currents Iu, Iv, Iw have the same level. This reduces the phase current of each phase for obtaining the desired brake effect. Thus, excessive increases in the phase currents Iu, Iv, Iw are limited when decelerating the rotor 51. Accordingly, the rotational frequency of the rotor 51 is promptly decreased while limiting interference in the operation of the inverter 55 that would be caused by excessive increases in the current flowing to the electric motor 16. This limits noise and vibration.

Additionally, since the lower arm switching element that is activated is sequentially switched, differences in the heat generation amount are reduced among the three lower arm switching elements Qu2, Qv2, Qw2. This limits situations in which only a certain lower arm switching element generates excessive heat among the three lower arm switching elements Qu2, Qv2, Qw2. Consequently, the rotor 51 is decelerated while limiting the local heat generation of the certain lower arm switching element.

(5) In particular, the brake effect is obtained when the lower arm switching element corresponding to the phase current having a positive value is activated. The lower arm switching element to which the phase current having a positive value may flow is sequentially switched in a predetermined order. Thus, if the lower arm switching element of only one designated phase is configured to be cyclically activated and deactivated, the deceleration is performed only during a period in which the phase current corresponding to the designated phase has a positive value. In this case, the rotor 51 is intermittently decelerated. This may result in, for example, a failure to obtain the sufficient brake effect or unstable reverse rotation of the rotor 51.

In this regard, in the present embodiment, the lower arm switching element that is activated is sequentially switched. Thus, the lower arm switching element corresponding to the phase current having a positive value is activated at a predetermined frequency (in present embodiment, at least one of three times). This allows for continuous deceleration and limits the above unfavorable situations.

Further, for example, the positive current period Ta of each of the phase currents Iu, Iv, Iw may be recognized in advance to control cyclic activation and deactivation of only the lower arm switching element that corresponds to the positive current period Ta. However, to perform this control, the rotation position of the rotor 51 needs to be recognized. Further, the rotation position needs to be synchronized with the switching of the lower arm switching elements Qu2, Qv2, Qw2. This may result in the need for a separate rotational angle sensor such as a resolver or the need to perform complicated control and thereby cause the configuration to be complicated.

In this regard, in the present embodiment, the lower arm switching element that is activated is sequentially switched as described above. Thus, the rotor 51 decelerates without the need to recognize the rotation position of the rotor 51 or synchronize the rotation position with the switching of the lower arm switching elements Qu2, Qv2, Qw2. This simplifies the configuration.

(6) The control device 60 starts the deceleration control by cyclically activating and deactivating the lower arm switching elements Qu2, Qv2, Qw2 using the predetermined initial deceleration switching pattern and the predetermined initial deceleration duty ratio. Then, the control device 60 variably controls at least one of the switching pattern and the duty ratio of the lower arm switching elements Qu2, Qv2, Qw2 so that the phase currents Iu, Iv, Iw increase in a range that does not exceed the tolerance value. In this configuration, the rotational frequency R of the rotor 51 is decreased in a relatively prompt manner while limiting excessive increases in the phase currents Iu, Iv, Iw when starting the deceleration control.

More specifically, the phase currents Iu, Iv, Iw increases more easily as the rotational frequency R of the rotor 51 increases. Thus, if the switching pattern and the duty ratio that easily increase the phase currents Iu, Iv, Iw are set from the beginning of the deceleration control, which is when the rotational frequency R is high, the phase currents Iu, Iv, Iw would have a tendency to excessively increase. However, if the deceleration control is continued using the switching pattern and the duty ratio that easily decrease the phase currents Iu, Iv, Iw, decreases in the rotational frequency R of the rotor 51 would be impeded.

In this regard, in the present embodiment, the deceleration control starts using the initial deceleration switching pattern and the initial deceleration duty ratio, and then the lower arm switching elements Qu2, Qv2, Qw2 are controlled to increase in a range such that the phase currents Iu, Iv, Iw do not exceed the tolerance value. This increases the brake effect while limiting a situation in which the phase currents Iu, Iv, Iw excessively increase when starting the deceleration control. This allows the first period T1 to be shortened.

(7) The control device 60 starts the continuation control by cyclically activating and deactivating the lower arm switching elements Qu2, Qv2, Qw2 using the initial continuation switching pattern and the initial continuation duty ratio. Then, the control device 60 variably controls at least one of the switching pattern and the duty ratio of the lower arm switching elements Qu2, Qv2, Qw2 so that the phase currents Iu, Iv, Iw gradually decrease. In this configuration, after the continuation control is started, thermal energy consumed by the electric motor 16 gradually decreases. Thus, during the continuation control, the rotational frequency R is maintained at a certain level even when the kinetic energy gradually decreases due to decreases in the pressure when the intermediate pressure refrigerant is discharged from the injection ports 43. This avoids a situation in which the continuation rotational frequency difference δR2 exceeds the deceleration rotational frequency difference δR1.

(8) After terminating the continuation control, the control device 60 executes the deactivation control, which stops the rotation of the rotor 51. In this configuration, the rotation of the rotor 51 is promptly stopped compared to a configuration in which the rotor 51 spontaneously decelerates after terminating the continuation control. This shortens the period from when the deceleration control is started until when the reverse rotation of the rotor 51 is stopped.

(9) The control device 60 recognizes the rotation direction and the rotational frequency R of the rotor 51 based on the phase currents Iu, Iv, IW that flow under the deceleration control and the continuation control. In this configuration, the rotation direction and the rotational frequency R of the rotor 51 are recognized without using a dedicated sensor or the like. This may achieve a sensor-less configuration. Further, the deceleration control and the continuation control may be effectively utilized by recognizing the rotation direction and the rotational frequency R of the rotor 51 based on the phase currents Iu, Iv, Iw flowing as a result of the deceleration control and the continuation control. In other words, energization control dedicated to the recognition of the rotation direction and the rotational frequency R of the rotor 51 does not need to be performed. This may simplify the control.

The above embodiment may be modified as follows.

The continuation control is not limited to a control that maintains the rotational frequency R at the target rotational frequency Rt. The continuation control may be, for example, a control that gradually decreases the rotational frequency R in a range such that the continuation rotational frequency difference δR2 is less than the deceleration rotational frequency difference δR1.

In the continuation control, the control device 60 may control the lower arm switching elements Qu2, Qv2, Qw2 so that the rotational frequency R increases in a range that is less than or equal to the rotational frequency tolerance Ra. Alternatively, the control device 60 may alternately repeat acceleration and deceleration. The continuation control only needs to be executed for a longer time than the first period T1 when the continuation rotational frequency difference δR2 is less than the deceleration rotational frequency difference δR1. The rotational frequency R may be changed in any specific mode during the continuation control. The difference in the rotational frequency R between when the deceleration control is started and when the deceleration control is terminated may be used as the continuation rotational frequency difference δR2.

The deceleration control and the continuation control are not limited to those of the embodiment and may have any specific switching control mode. The control device 60 may be configured, for example, to cyclically activate and deactivate the lower arm switching element of only a predetermined fixed phase and maintain the lower arm switching element of the remaining phases in the deactivation state. Alternatively, the control device 60 may be configured to cyclically activate and deactivate the lower arm switching elements Qu2, Qv2, Qw2 of the three phases by synchronizing the rising timing and the falling timing.

In the deceleration control, the control device 60 only needs to use the switching pattern and the duty ratio that increase the phase currents Iu, Iv, Iw more easily as the rotational frequency R decreases. The switching pattern and the duty ratio may be changed in any specific mode.

In the deceleration control, the control device 60 may be configured not to change the switching pattern and the duty ratio from the initial deceleration switching pattern and the initial deceleration duty ratio. In the same manner, in the continuation control, the control device 60 may be configured not to change the switching pattern and the duty ratio from the initial continuation switching pattern and the initial continuation duty ratio.

The initial continuation switching pattern and the initial continuation duty ratio are not limited to the switching pattern and the duty ratio that are obtained when the deceleration control is terminated and may be any switching pattern and any duty ratio as long as the rotational frequency R does not excessively fluctuate.

The target rotation frequency Rt that triggers the termination of the deceleration control may differ from the target rotation frequency Rt that is maintained in the continuation control. The control device 60 may, for example, execute the deceleration control until the rotational frequency R becomes a first target rotational frequency and then continue the reverse rotation of the rotor 51 so that the rotational frequency R becomes close to a second target rotational frequency rather than the first target rotational frequency. In this case, the second target rotational frequency is preferably less than or equal to the rotational frequency tolerance Ra. The first target rotational frequency may be less than or equal to the rotational frequency tolerance Ra or slightly greater than the rotational frequency tolerance Ra.

The deactivation control may be omitted. In this case, the rotor 51 spontaneously decelerates and stops.

The termination trigger condition for the deceleration control is not limited to a state in which the rotational frequency R becomes the target rotational frequency Rt. The termination trigger condition for the deceleration control may be, for example, a state in which a predetermined first period T1 ends from the start time of the deceleration control.

Condition (B) may be omitted from the continuation control termination condition. In this case, the second period T2 is preferably set so that the intermediate pressure refrigerant is sufficiently discharged regardless of the state during the deactivation.

When condition (B) is omitted, the second period T2 may be set in correspondence with the first period T1. The second period T2 may be set, for example, to be longer as the first period T1 shortens. Consequently, when the discharge amount of the intermediate pressure refrigerant is small due to the short first period T1 during the deceleration control, the discharge amount of the intermediate pressure refrigerant may be increased during the continuation control. This appropriately discharges the intermediate pressure refrigerant.

In the embodiment, the subject arm switching elements of the three phases, which are subject to the switching, are the lower arm switching elements Qu2, Qv2, Qw2. Instead, for example, the upper arm switching elements Qu1, Qv1, Qw1 may be used. More specifically, the control device 60 may cyclically activate and deactivate the upper arm switching elements Qu1, Qv1, Qw1 so that the upper arm switching element that is activated is sequentially switched. In this case, the lower arm switching elements Qu2, Qv2, Qw2 preferably maintain, for example, the deactivation state. The current sensors 61 to 63 are preferably arranged on the phase wires ELu to ELw between the upper arm switching elements Qu1, Qv1, Qw1 and the first power line EL1.

Thus, in the deceleration control, the control device 60 may use a switching control mode that switches the upper arm switching elements Qu1, Qv1, Qw1 to sequentially switch the upper arm switching element that is activated.

The control device 60 may switch (i.e., cyclically activate and deactivate) both the upper arm switching elements Qu1, Qv1, Qw1 and the lower arm switching elements Qu2, Qv2, Qw2. More specifically, the subject arm switching elements of the three phases, which are subject to the switching, may be both the upper arm switching elements Qu1, Qv1, Qw1 of the three phases and the lower arm switching elements Qu2, Qv2, Qw2 of the three phases. In this case, the control device 60 preferably controls the switching elements so that the upper arm switching element and the lower arm switching element of the same phase are not simultaneously activated. More specifically, the control device 60 may use a switching control mode that sequentially switches the upper arm switching element that is activated and also sequentially switches the lower arm switching element that is activated so that the upper arm switching element and the lower arm switching element of the same phase are not simultaneously activated.

More specifically, in the deceleration control, the control device 60 only needs to decelerate the rotor 51 by activating at least one of the upper arm switching elements Qu1, Qv1, Qw1 of the three phases and the lower arm switching elements Qu2, Qv2, Qw2 of the three phases. In this case, the switching control mode used by the control device 60 in the deceleration control only needs to include the first mode, in which one or more of the switching elements Qu1 to Qw2 are activated while the remaining switching elements are deactivated, and the second mode, which differs from the first mode in the combination of the switching element that is activated and the switching element that is deactivated. This limits situations in which only a certain switching element locally generates heat. Thus, the rotor 51 is appropriately decelerated.

The second mode only needs to differ from the first mode in the combination of the activation and deactivation states of the switching elements Qu1 to Qw2. Thus, in the second mode, some of the switching elements of the phases that are activated may be the same as the first mode. In the two-phase pattern, for example, a mode in which Qu2, Qv2 are activated while Qu1, Qv1, Qw1, Qw2 are deactivated is referred to as the first mode. A mode in which Qv2, Qw2 are activated while Qu1, Qv1, Qw1, Qu2 are deactivated is referred to as the second mode. In this case, the v-phase lower arm switching element Qv2 is activated in the first mode and the second mode. However, the u-phase lower arm switching element Qu2 is activated in the first mode, and the w-phase lower arm switching element Qw2 is activated in the second mode. Thus, the first mode and the second mode have different switching elements of the phases that are activated.

The control device 60 may be configured to variably control one of the switching pattern and the duty ratio. For example, the control device 60 may fix the switching pattern to one of the one-phase pattern and the two-phase pattern and variably control only on the duty ratio. Alternatively, the control device 60 may fix the duty ratio and switch the switching pattern to the one-phase pattern or the two-phase pattern. The control device 60 only needs to variably control at least one of the switching pattern and the duty ratio in accordance with the rotational frequency R.

The one-phase pattern may have any order of the lower arm switching element that is activated. For example, the one-phase pattern may be configured to switch the lower arm switching element that is activated in order from the w-phase lower arm switching element Qw2 to the v-phase lower arm switching element Qv2 and then the u-phase lower arm switching element Qu2. The two-phase pattern may be configured in the same manner.

The two-phase pattern may have any combination of phases that are simultaneously activated.

The switching pattern may have any specific mode as long as the subject arm switching element that is activated is sequentially switched. The switching pattern may have a mode in which, for example, the subject arm switching elements are sequentially activated one phase at a time in a predetermined order between the three-phase activation periods, during which the subject arm switching elements of the three phases are all activated.

In the two-phase pattern of the embodiment, the lower arm switching elements Qu2, Qv2, Qw2 rise to the activation state at different timings. Instead, the two-phase pattern may be, for example, a switching pattern in which the lower arm switching elements of two phases rise to the activation state at the same timing. For example, the two-phase pattern may be a pattern in which switching occurs in the order of Qu2, Qv2 are activated while Qw2 is deactivated; Qu2, Qv2, Qw2 are deactivated; Qv2, Qw2 are activated while Qu2 is deactivated; Qu2, Qv2, Qw2 are deactivated; Qu2, Qw2 are activated while Qv2 is deactivated; Qu2, Qv2, Qw2 are deactivated; Qu2, Qv2 are activated while Qw2 is deactivated; and so on. Thus, the two-phase pattern may be a switching pattern in which the subject arm switching elements are sequentially activated two phases at a time in a predetermined order between interval periods during which the subject arm switching elements of the three phases are all deactivated. In other words, the two-phase pattern only needs to include at least one of a switching pattern including the interval period, a switching pattern including the one-phase activation period, a switching pattern including the three-phase activation period, and a switching patter that does not include any of the interval period, the one-phase activation period, and the three-phase activation period.

In the embodiment, the lower arm switching elements Qu2, Qv2, Qw2 rise to the activation state at different timings. Thus, the switching pattern is switched to the one-phase pattern or the two-phase pattern by adjusting the duty ratio. However, as described above, when the lower arm switching elements Qu2, Qv2, Qw2 rise to the activation state at the same timing (i.e., there is no phase difference), the adjustment of the duty ratio does not switch the switching pattern. Therefore, the duty ratio and the switching pattern may or may not be associated with each other.

The control device 60 may have any specific structure for recognizing the rotation direction and the rotational frequency R of the rotor 51. The structure may include, for example, a rotation angle sensor such as a resolver and perform the recognition based on the detection result of the rotation angle sensor.

When a predetermined condition is satisfied, for example, when the rotational direction of the rotor 51 that is obtained by the recognition control is the reverse direction and the rotational frequency R that is obtained by the recognition process is less than or equal to a predetermined threshold value, the control device 60 does not have to execute at least one of the deceleration control and the continuation control. More specifically, the control device 60 is not limited to the configuration that always executes the deceleration control and the continuation control after the motor-driven compressor 10 is deactivated (i.e., when the rotor 51 reversely rotates). The control device 60 may be configured to execute the deceleration control and the continuation control when a specified condition is satisfied (e.g., when the reverse rotational frequency R is greater than the above threshold value) after the motor-driven compressor 10 is deactivated. The control device 60 only needs to function to perform the deceleration control and the continuation control.

The threshold value may be any value as long as the value is relatively small. The threshold value may be, for example, the target rotational frequency Rt or lower. Alternatively, the threshold value may be greater than the target rotational frequency Rt and less than the rotational frequency tolerance Ra. Alternatively, the threshold value may be, for example, the rotational frequency tolerance Ra.

The injection ports 43 may be located at any position. Any number of injection ports 43 may be used.

The subject in which the motor-driven compressor 10 is installed is not limited to a vehicle and may be any subject.

The motor-driven compressor 10 is used with the vehicle air conditioner 100 but may be used with another device. For example, when the vehicle is a fuel cell vehicle (FCV) that includes a fuel cell, the motor-driven compressor 10 may be used with a supply device that supplies air to the fuel cell. Thus, the compression subject may be any fluid. The fluid may be a refrigerant or air.

The embodiment and modified examples may be combined. For example, the control device 60 may be configured to switch the upper arm switching elements Qu1, Qv1, Qw1 of the three phases to sequentially switch the upper arm switching element that is activated and then switch the lower arm switching elements Qu2, Qv2, Qw2 of the three phases to sequentially switch the lower arm switching element that is activated. Alternatively, the control device 60 is configured to switch the upper arm switching elements Qu1, Qv1, Qw1 of the three phases or the lower arm switching elements Qu2, Qv2, Qw2 of the three phases and then switch all of the switching elements Qu1 to Qw2.

Therefore, the present examples and embodiments are to be considered as illustrative and not restrictive and the invention is not to be limited to the details given herein, but may be modified within the scope and equivalence of the appended claims.

The invention claimed is:

1. A motor-driven compressor comprising:
an electric motor including a rotor;
a housing including a suction port that draws in a fluid;
a compression unit driven by the electric motor, wherein the compression unit compresses an intake fluid, which is the fluid drawn in from the suction port, and discharges a compressed fluid, which is the compressed intake fluid;
a drive circuit that drives the electric motor; and
a controller that controls the drive circuit to control rotation of the rotor, wherein
the compression unit includes
a fixed scroll fixed to the housing,
a movable scroll engaged with the fixed scroll and configured to orbit the fixed scroll, and
a compression chamber defined by the fixed scroll and the movable scroll,
when the rotor rotates in a predetermined forward direction, the movable scroll orbits in the forward direction, and the compression unit thereby compresses the intake fluid drawn into the compression chamber,
the motor-driven compressor further comprises an injection port that draws an intermediate pressure fluid into the compression chamber, wherein the intermediate pressure fluid has a pressure that is higher than the intake fluid and lower than the compressed fluid,
the controller includes
a deceleration controller that performs a deceleration control, which decelerates the rotor, during a first period in response to the rotor being rotating in a direction opposite to the forward direction, and
a continuation controller that performs a continuation control, which continues the rotation of the rotor, during a second period that is longer than the first period after the deceleration control is performed, and a fluctuation difference of a rotational frequency of the rotor during the continuation control is less than a deceleration rotational frequency difference, which is a difference between a rotational frequency of the rotor when the deceleration control is started and a rotational frequency of the rotor when the deceleration control is terminated.

2. The motor-driven compressor according to claim 1, wherein the deceleration controller is configured to decelerate the rotor until the rotational frequency of the rotor becomes a target rotational frequency, wherein the target rotational frequency is set to be less than or equal to a predetermined rotational frequency tolerance, and the continuation controller is configured to continue the rotation of the rotor with the rotational frequency of the rotor maintained so that the rotational frequency of the rotor is less than or equal to the rotational frequency tolerance during the second period.

3. The motor-driven compressor according to claim 2, wherein the continuation controller is configured to control the drive circuit so that the rotational frequency of the rotor is maintained at the target rotational frequency.

4. The motor-driven compressor according to claim 1, wherein the electric motor is a three-phase motor, the drive circuit includes a u-phase upper arm switching element and a u-phase lower arm switching element connected to each other, a v-phase upper arm switching element and a v-phase lower arm switching element connected to each other, and a w-phase upper arm switching element and a w-phase lower arm switching element connected to each other, the controller is configured to control switching of the upper arm switching elements of the three phases and the lower arm switching elements of the three phases, and in the deceleration control, the deceleration controller controls the drive circuit in a switching control mode that includes a first mode, in which one or more switching elements of the upper arm switching elements of the three phases and the lower arm switching elements of the three phases are activated while the remaining switching elements are deactivated, and a second mode, which differs from the first mode in a combination of the activated and deactivated switching elements.

5. The motor-driven compressor according to claim 4, wherein the switching control mode in the deceleration control includes one of a mode that switches the upper arm switching elements of the three phases to sequentially switch the upper arm switching element that is activated, a mode that switches the lower arm switching elements of the three phases to sequentially switch the lower arm switching element that is activated, and a mode that switches the upper arm switching elements of the three phases and the lower arm switching elements of the three phases to sequentially switch the switching element that is activated without simultaneously activating the upper arm switching element and the lower arm switching element of the same phase.

6. The motor-driven compressor according to claim 5, wherein the deceleration controller is configured to start the deceleration control by cyclically activating and deactivating subject arm switching elements of the three phases, which are subject to switching, using a predetermined initial deceleration switching pattern and a predetermined initial deceleration duty ratio and then variably control at least one of a switching pattern and a duty ratio of the subject arm switching elements of the three phases so that a current flowing to the three-phase motor increases in a range that does not exceed a predetermined tolerance value.

7. The motor-driven compressor according to claim 6, wherein the initial deceleration switching pattern and the initial deceleration duty ratio are set so that the current flowing to the three-phase motor does not exceed the tolerance value regardless of the rotational frequency of the rotor.

8. The motor-driven compressor according to claim 4, wherein the continuation controller is configured to start the continuation control by cyclically activating and deactivating the subject arm switching elements of the three phases, which are either or both of the upper arm switching elements of the three phases and the lower arm switching elements of the three phases, using a predetermined initial continuation switching pattern and a predetermined initial continuation duty ratio and then variably control at least one of a switching pattern and a duty ratio of the subject arm switching elements of the three phases to gradually decrease a current flowing to the three-phase motor.

9. The motor-driven compressor according to claim 1, wherein the controller is configured to perform a deactivation control that stops the rotation of the rotor after terminating the continuation control.

\* \* \* \* \*